3,244,440
COMPONENT PARTS OF LOADING ARMS
Albert A. Ashton, Dallas, and Harrod A. Nichols, Garland, Tex., and Melvin J. Palmer, Huntington Park, Calif., assignors to The Youngstown Sheet and Tube Company, Youngstown, Ohio, a corporation of Ohio
Original application June 6, 1960, Ser. No. 34,056. Divided and this application Dec. 31, 1963, Ser. No. 337,704
1 Claim. (Cl. 285—276)

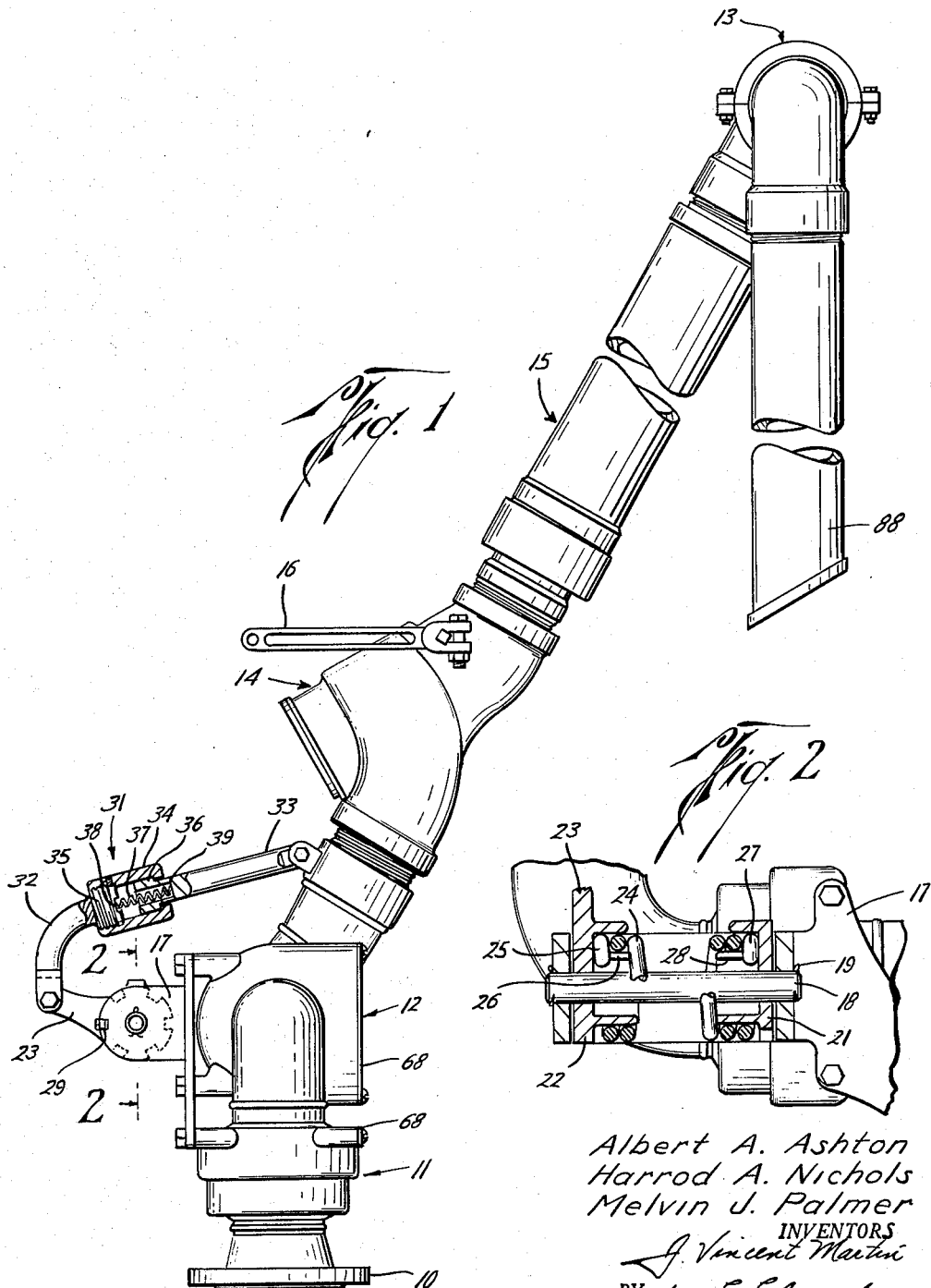

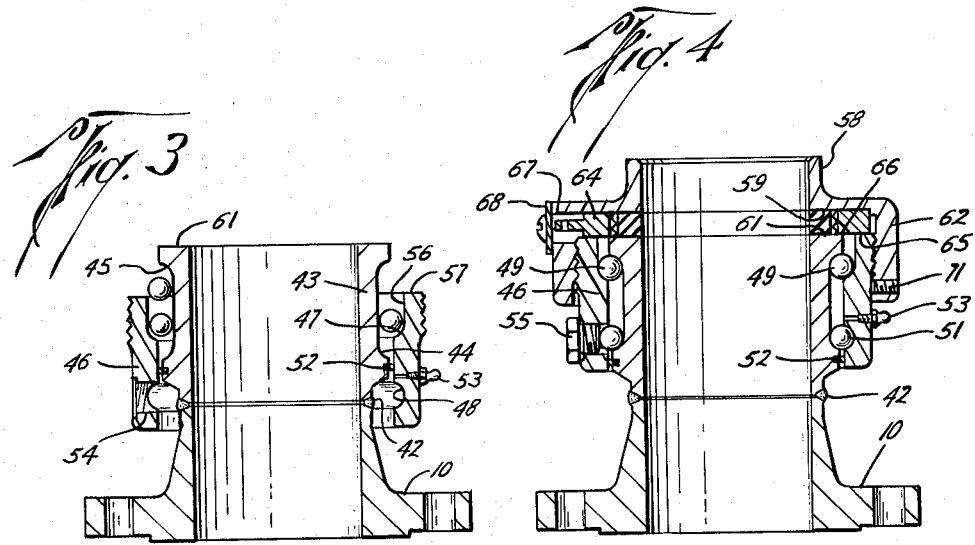
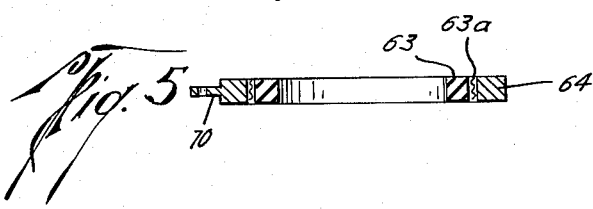
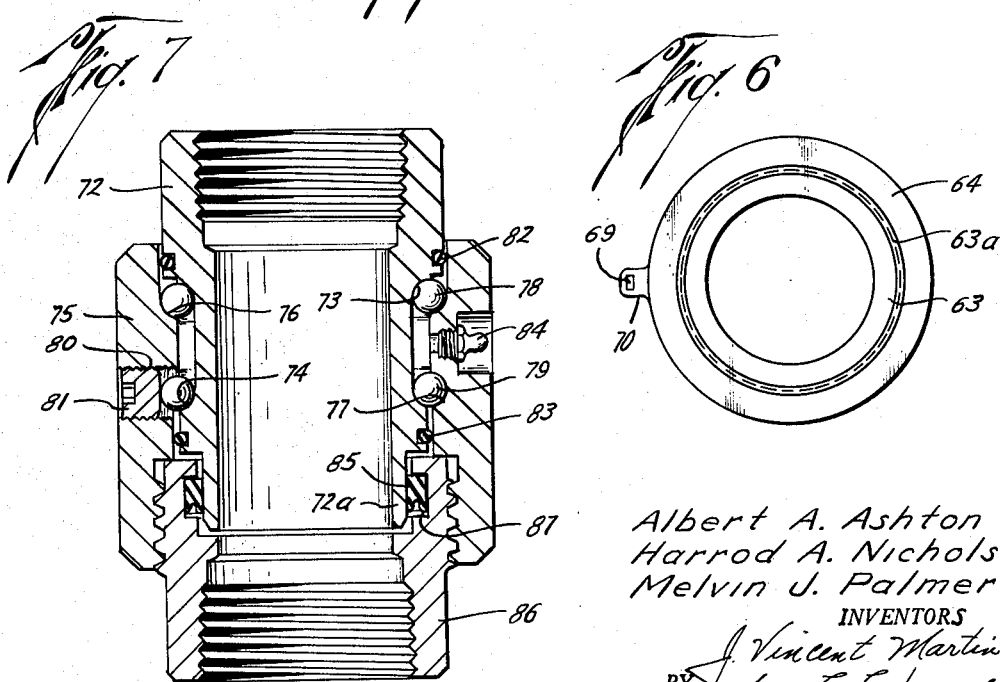
Albert A. Ashton
Harrod A. Nichols
Melvin J. Palmer
INVENTORS
BY J. Vincent Martin
Joe E. Edwards
M. K. Gay
ATTORNEYS United States Patent Office 3,244,440
Patented Apr. 5, 1966

This application is a division of our co-pending application Serial No. 34,056, filed June 6, 1960 now abandoned.

This invention relates to component parts of loading arms, and more particularly to buffer mechanisms for loading arms and swivel couplings for loading arms and the like.

An object is to provide a swivel joint having spherical ball races in which one race may be filled with balls during assembly and another race filled through a feed hole after assembly.

Another object is to provide a swivel joint having spherical ball races which has relatively few parts, is easy to assemble and requires no bearing adjustment.

Another object is to provide a swivel joint in which a seal may be replaced without disassembling the joint or disturbing the bearings.

Other objects, features and advantages of this invention will be apparent from the drawings, the specification and the claim.

In the drawings, wherein like reference numerals indicate like parts:

FIGURE 1 is a view in elevation of a loading arm constructed in accordance with this invention with the buffer assembly shown in section;

FIGURE 2 is a view along the line 2—2 of FIGURE 1 showing the counterbalance mechanism;

FIGURE 3 is a view in cross-section of the lower swivel joint of the FIGURE 1 loading arm with the parts in partially assembled position and the balls being fed into the upper race;

FIGURE 4 is a view similar to FIGURE 3 showing the entire swivel joint in fully assembled position;

FIGURE 5 is a view in cross-section through the seal employed in FIGURE 4;

FIGURE 6 is a top plan view of the seal employed in the FIGURE 4 swivel joint; and FIGURE 7 is a view in cross-section through a modified form of swivel joint.

The loading arm of FIGURE 1 is adapted to be secured through its base flange 10 to an outlet for dispensing fluids and to deliver such fluids to a suitable container through the nozzle outlet 88. In order to freely position the nozzle outlet with respect to the container to be filled, the loading arm includes a swivel indicated generally at 11 for rotation about a vertical axis, a swivel indicated generally at 12 for rotation about a horizontal axis, and a third swivel indicated generally at 13 for rotation about a horizontal axis. Preferably, swivels 11 and 12 are constructed in accordance with the swivels shown in FIGURES 3 and 7.

A suitable valve indicated generally at 14 controls flow through the conduit indicated generally at 15. The valve 14 is controlled by the operating handle 16.

Reference is made to FIGURE 2 wherein the counterbalance mechanism is shown. This mechanism is mounted to the swivel joint 12 by a bracket 17. A pin 18 is secured in the bracket by a cotter key 19. Mounted on the pin is a pair of spaced spring supports 21 and 22. The spring support 22 forms a part of the rotatable arm 23. A coil spring 24 is positioned between the spring supports 21 and 22 and has one end 25 extending into a slot 26 on spring support 22 and the other end 27 extending into a slot 28 on spring support 21.

The spring support 21 is held against rotation relative to the mounting bracket 17 by a removable lock retained by a secrew 29 (FIG. 1) which permits selective rotation of spring support 21 to control the amount of counterbalancing force exerted by the spring.

From the description thus given, it is believed apparent that as the conduit 15 is pulled down the rotation of arm 23 relative to the spring support 21 will cause the spring 24 to be placed in tension and counterbalance the weight of the conduit 15.

Reference is now made to the buffer assembly indicated generally at 31 on FIGURE 1 which absorbs the inertia force of the conduit as it moves to fully raised position. This buffer includes a pair of arms 32 and 33, one of which is pivoted to the member 23 and the other of which is pivoted to the conduit 15. The buffer 31 includes a lost motion connection between these two arms which absorbs the force exerted by the conduit as it moves to fully raised position. A sleeve 34 is threadedly secured to the threaded end 35 of arm 32. The arm 33 has an enlarged end 36 which is slidable within the sleeve 34. Resilient means such as spring 37 is placed in compression between the two arms 32 and 33 to urge them apart and when the conduit 15 moves to fully raised position, the inertia of the conduit is absorbed by the compression of spring 37. In order to maintain the spring in alignment with arm 33 the spring is received in a socket 38 in the end of the enlarged portion 35 of arm 32 and the other end of the spring 37 extends into a bore 39 in arm 33.

Reference is now made to FIGURE 4 which illustrates the swivel joint 11 of FIGURE 1. The flange 10 or another suitable fitting may be welded or otherwise secured to the swivel joint as shown at 42.

The swivel joint includes an inner tubular telescoping member 43 which is secured to the flange 10 by weld 42. This inner telescoping member has a lower ball race 44 and an upper ball race 45.

An outer telescoping tubular member 46 is telescoped over the inner tubular member 43 and is provided with upper ball race 47 and lower ball race 48 to cooperate with the upper and lower ball races, respectively, on the inner tubular member.

A plurality of balls 49 are positioned in the upper ball race and a plurality of balls 51 are positioned in the lower ball race to provide for relative rotational movement between the inner and outer tubular members while preventing relative longitudinal or axial movement between these members.

A suitable dust seal and lubrication retainer 52 may be provided below the lower ball race and the balls lubricated through a fitting 53.

The ball race 45 on the inner tubular member is spaced or removed from the end 61 of the inner tubular member 43. The ball race 47 in the outer tubular member is adjacent the end 57 of the outer tubular member 46. The inner member 43 is axially slideably in the outer member 46 an amount at least equal to the distance of race 45 from the end 61 of the inner tubular member plus the diameter of the balls 49 to permit insertion of the balls with the telescoping members in unassembled position.

Reference is made to FIGURE 3 which illustrates the manner in which the balls are positioned in the upper ball race. During assembly, the outer telescoping member is moved downwardly over the inner telescoping member to the position shown in FIGURE 3. Then the balls 49 are fed into the upper ball race and the outer telescoping member moved upward to the position shown in FIGURE 4. With the telescoping members in this position, the balls 51 are fed into the lower ball race through a feed hole 54 in the outer tubular member. After the lower balls 51 are all in position, the feed hole 54 is closed with a suitable plug 55.

It will be noted that this method of assembly is permitted by making one of the surfaces between one end of one of the tubular members and one of the ball races of a dimension which permits the insertion of the balls in one ball race while the swivel is in partially assembled position. In the preferred form, the diameter of surface 56 between the upper end 57 of the outer tubular member and the upper ball race is at least as great as the maximum diameter of the upper ball race in the outer tubular member which permits this method of assembly.

Reference is now made to FIGURE 4, wherein a seal is provided which may be removed without disassembling the coupling.

An end fitting 58 is provided which has an endwise surface 59 which confronts the end 61 of the inner tubular member 43. The end fitting 58 bells out and terminates in a sleeve 62 which is threadedly secured to the outer telescoping member 46.

Within the space provided between the confronting surface 59 and end of the inner tubular member 43, a seal assembly including an inner resilient seal member 63 and an outer relatively rigid member 64 is provided. It is preferred that resilient member 63 when in its unstressed position flares inwardly to have a greater axial dimension at its inner diameter than at its outer diameter. This insures that when the seal is clamped in place the seat at its fore will have an interference fit with the surfaces 59 and 61 to seal between these surfaces. If desired, the seal member may have an outer reinforced section 63a. This section may be reinforced with duck material in the manner well understood by those skilled in the art.

The outer relatively rigid member 64 provides a backup for the resilient seal 63 to prevent its extrusion under high pressure. Preferably, the backup member is made from metal, but other materials may be used.

The backup member 64 is dimensioned to be clamped between the surface 59 and the upper end 65 of the outer tubular member 46. Preferably, when the backup member is clamped in place, its lower innermost corner 66 overlies the outer circumferential extremity of the end 61 of the inner tubular member 43. The corner 66 of the support ring 64 should have a close tolerance with the endwise surface 61 to prevent extrusion of the resilient seal material 63 therebetween. A slight rubbing fit could be employed, but it is preferred to have a close tolerance without more than slight contact at this point.

In order to provide for easy replacement of the seal assembly, the sleeve 62 is provided with a side door 67 which is of sufficient size to permit the lateral movement of the entire sleeve assembly therethrough. This side door is covered by a suitable dust cover 68.

When it is desired to replace the seal assembly, the outer sleeve 62 is backed off slightly from the outer tubular member 46 to release the seal assembly. After the dust cover 68 is removed, the seal assembly may be grasped by a suitable tool projected into eye 69 on an ear 70 carried by the outer backup portion 64 of the seal assembly. The seal assembly may be removed and replaced in this manner through the side door 67. After the seal assembly is again the position shown in FIGURE 4, the outer sleeve 62 is run up over the outer tubular member 46 until the rigid portion 64 of the seal assembly is clamped between these members. Thereafter, the sleeve and outer tubular member are locked in position with suitable set screws one of which is shown at 71. As the sleeve and outer tubular member are brought into firm contact with the seal assembly, the resilient portion 63 will be compressed to provide an interference fit between the resilient seal and the end fitting 58, as well as the inner tubular member 43, to provide a rotating seal between these parts.

Reference is now made to FIGURE 7 in which a modified form of swivel joint is shown which is generally similar in function with the swivel assembly of FIGURE 4 except that it employs a lip type seal which necessitates breaking of the coupling to replace the seal. It will be appreciated that the FIGURE 4 form is preferred as the seal may be replaced without removing the entire loading arm from the support fitting 41. Also, the FIGURE 4 form will eliminate the necessity of disassembling portions of the conduit 15 where the other swivel joints employ this seal feature.

In the FIGURE 7 form the inner telescoping member 72 has provided therein upper and lower ball races 73 and 74. The outer tubular member 75 is likewise provided with upper ball race 76 and lower ball race 77 which cooperate with the ball races on the inner tubular member to support the plurality of balls 78 in the upper ball race and a plurality of balls 79 in the lower ball race. It will be noted that the balls 78 may be placed in the ball race by movement of the outer tubular member 75 downwardly relative to the inner tubular member 72 in the manner shown in FIGURE 3. Thereafter, the tubular members are moved to assembled position and the balls 79 are fed into position through the feed inlet 80, after which the plug 81 may be positioned in the hole 80 to complete the lower ball race.

Preferably, suitable dust seals 82 and 83 are provided above and below the ball races and lubrication may be provided through a suitable fitting 84.

In employing the lip type of seal member 85, it is preferred to use an end fitting 86 which is threadedly received within the outer tubular member 75. The end fitting 86 has a groove 87 in its inner periphery in which the seal member 85 is positioned. The lower end of the inner tubular member 72 is provided with a boss section 72a which sealingly engages the inner periphery of the seal member 85. As the interior of the swivel coupling is pressurized, the downwardly facing lips of the seal member 85 are spread apart to provide a rotating seal between the end fitting 86 and the inner tubular member 72.

The foregoing disclosure and description of the invention is illustrative and explanatory thereof and various changes in the size, shape and materials, as well as in the details of the illustrated construction, may be made within the scope of the appended claim without departing from the spirit of the invention.

What is claimed is:

A swivel coupling comprising,
  an inner telescoping member,
  an outer telescoping member movable axially over the inner telescoping member,
  first and second cooperating ball races on the inner and outer telescoping members, respectively,
  a plurality of balls in said first and second races,
  said first ball race removed from the end of the inner telescoping member,
  said second ball race adjacent the end of the outer telescoping member,
  said inner member being axially slidable in said outer member between assembled and unassembled positions at least an amount equal to the distance of said first race from the end of said outer member when the members are in assembled position plus the diameter of said balls to permit insertion of said balls with the telescoping members in unassembled position,
  third and fourth cooperating ball races in said inner and outer telescoping members, respectively,
  a radially extending hole in the wall of one of the telescoping members overlying the third and fourth race,
  a plurality of balls in said third and fourth race, said balls inserted in said third and fourth race after the telescoping members are in assembled position thereby maintaining said members in said assembled position, means plugging said hole after the balls are positioned in the third and fourth races, an end fitting having a surface confronting an end of said inner tubular member, said end fitting having a sleeve portion extending beyond said end fitting surface and releasably secured to the outer tubular member by threads, a side door in such sleeve portion adjacent such surface providing for insertion and removal of a seal assembly, and a seal assembly positioned between said end fitting surface and said end of said inner tubular member and including a resilient member having an interference fit with said end fitting surface and said end of said inner tubular member.

References Cited by the Examiner

UNITED STATES PATENTS

| | | | |
|---|---|---|---|
| 2,238,535 | 4/1941 | Meyer | 285—374 |
| 2,312,341 | 3/1943 | King | 285—108 |
| 2,817,543 | 12/1957 | Corsette | 285—281 |
| 2,833,566 | 5/1958 | Meyer | 285—379 X |
| 2,833,568 | 5/1958 | Corsette | 285—349 |
| 2,927,805 | 3/1960 | Faccou | 285—16 X |

FOREIGN PATENTS 46,553   2/1911   Austria.

CARL W. TOMLIN, *Primary Examiner.*